United States Patent
Rofka et al.

(10) Patent No.: US 9,200,540 B2
(45) Date of Patent: Dec. 1, 2015

(54) COMBINED CYCLE WITH RECIRCULATION PLANT INLET OXYGEN CONCENTRATION SYSTEM

(75) Inventors: Stefan Rofka, Nussbaumen (CH); Frank Sander, Rieden (CH); Eribert Benz, Birmenstorf (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 859 days.

(21) Appl. No.: 13/271,098

(22) Filed: Oct. 11, 2011

(65) Prior Publication Data

US 2012/0090326 A1   Apr. 19, 2012

(30) Foreign Application Priority Data

Oct. 19, 2010   (EP) ..................................... 10188018

(51) Int. Cl.
*F02C 3/34*   (2006.01)
*F23C 9/00*   (2006.01)
(Continued)

(52) U.S. Cl.
CPC ................. *F01K 23/101* (2013.01); *F02C 3/34* (2013.01); *F02C 9/20* (2013.01); *F02C 9/40* (2013.01); *F05D 2260/61* (2013.01); *F05D 2260/80* (2013.01); *F23C 9/00* (2013.01); *F23C 2202/30* (2013.01); *F23N 2041/20* (2013.01)

(58) Field of Classification Search
CPC ....... Y02E 20/185; Y02C 20/10; F02D 21/04; F02M 35/0754; F02C 3/34; F02C 9/20; F02C 9/40; F23C 9/00; F01K 23/101; F05D 2260/61; F05D 2260/80
USPC .................... 60/39.182, 39.5, 39.52, 793, 794
See application file for complete search history.

(56) References Cited

U.S. PATENT DOCUMENTS

| | | | | |
|---|---|---|---|---|
| 3,044,258 A | * | 7/1962 | Carlton et al. | ............. 239/127.3 |
| 3,368,352 A | * | 2/1968 | Hewson | ........................... 60/224 |

(Continued)

FOREIGN PATENT DOCUMENTS

| | | |
|---|---|---|
| CN | 101429891 A | 5/2009 |
| CN | 101446241 A | 6/2009 |

(Continued)

OTHER PUBLICATIONS

Aug. 28, 2014 Japanese Office Action issued in Japanese Application No. 2011-228774 (with English language translation).

(Continued)

*Primary Examiner* — Phutthiwat Wongwian
*Assistant Examiner* — Rene Ford
(74) *Attorney, Agent, or Firm* — Buchanan Ingersoll & Rooney PC

(57) ABSTRACT

A power plant includes a gas turbine unit adapted to feed flue gases into a diverter where they are divided into a recirculated flow that is fed into a mixer together with fresh air to form a mixture that is fed to a gas turbine unit compressor inlet, and a discharged flow, that is fed into a $CO_2$ capture unit. A monitoring system for the mixture oxygen content at the compressor inlet is provided. The monitoring system includes a recirculated flow mass flow rate sensor, a recirculated flow oxygen concentration sensor, mixture mass flow rate sensors, a control unit arranged to process information detected by the recirculated flow mass flow rate sensor, recirculated flow oxygen concentration sensor and mixture mass flow rate sensor, to determine an oxygen concentration upstream of the compressor inlet.

14 Claims, 1 Drawing Sheet

(51) Int. Cl.
*F01K 23/10* (2006.01)
*F02C 9/20* (2006.01)
*F02C 9/40* (2006.01)

(56) References Cited

U.S. PATENT DOCUMENTS

| | | | | |
|---|---|---|---|---|
| 4,271,664 | A * | 6/1981 | Earnest | 60/39.181 |
| 4,285,830 | A * | 8/1981 | Muller | 588/19 |
| 4,434,613 | A * | 3/1984 | Stahl | 60/784 |
| 5,743,079 | A * | 4/1998 | Walsh et al. | 60/773 |
| 5,771,867 | A * | 6/1998 | Amstutz et al. | 123/568.21 |
| 5,855,111 | A * | 1/1999 | Oguchi et al. | 60/39.5 |
| 5,857,321 | A * | 1/1999 | Rajamani et al. | 60/39.27 |
| 6,003,316 | A * | 12/1999 | Baert et al. | 60/605.2 |
| 6,029,451 | A * | 2/2000 | Gartner | 60/605.2 |
| 6,095,175 | A * | 8/2000 | Miller et al. | 137/15.18 |
| 6,095,793 | A * | 8/2000 | Greeb | 431/12 |
| 6,256,976 | B1 * | 7/2001 | Kataoka et al. | 60/775 |
| 6,364,602 | B1 * | 4/2002 | Andrew et al. | 415/1 |
| 6,506,010 | B1 * | 1/2003 | Yeung et al. | 415/1 |
| 6,508,241 | B2 * | 1/2003 | Miller et al. | 123/672 |
| 6,619,261 | B1 * | 9/2003 | Wang et al. | 123/435 |
| 6,637,183 | B2 * | 10/2003 | Viteri et al. | 60/39.182 |
| 6,687,601 | B2 * | 2/2004 | Bale et al. | 701/108 |
| 6,688,166 | B2 * | 2/2004 | Gerhard et al. | 73/114.32 |
| 6,697,729 | B2 * | 2/2004 | Wright | 701/104 |
| 6,725,847 | B2 * | 4/2004 | Brunemann et al. | 123/568.12 |
| 6,729,315 | B2 * | 5/2004 | Onodera et al. | 123/568.21 |
| 6,813,875 | B2 * | 11/2004 | Inoue | 60/39.281 |
| 6,886,336 | B2 * | 5/2005 | Super et al. | 60/605.2 |
| 6,951,111 | B2 * | 10/2005 | Chen | 60/775 |
| 7,117,078 | B1 * | 10/2006 | Gangopadhyay | 701/103 |
| 7,350,471 | B2 * | 4/2008 | Kalina | 110/348 |
| 7,438,061 | B2 * | 10/2008 | Wang et al. | 123/559.1 |
| 7,559,977 | B2 * | 7/2009 | Fleischer et al. | 95/236 |
| 7,715,975 | B2 | 5/2010 | Yamaoka et al. | |
| 7,946,162 | B2 * | 5/2011 | Vennettilli et al. | 73/114.73 |
| 8,056,318 | B2 | 11/2011 | Chillar et al. | |
| 8,117,825 | B2 | 2/2012 | Griffin et al. | |
| 8,311,684 | B2 * | 11/2012 | Riverin | 700/301 |
| 8,393,138 | B2 * | 3/2013 | Hu et al. | 60/39.52 |
| 8,424,282 | B2 | 4/2013 | Vollmer et al. | |
| 8,532,912 | B2 * | 9/2013 | Kawamura et al. | 701/109 |
| 8,661,780 | B2 | 3/2014 | Wettstein et al. | |
| 8,893,506 | B2 | 11/2014 | Riensche et al. | |
| 2002/0043063 | A1 * | 4/2002 | Kataoka et al. | 60/39.182 |
| 2002/0100463 | A1 * | 8/2002 | Jaliwala et al. | 123/568.21 |
| 2005/0132713 | A1 * | 6/2005 | Neary | 60/784 |
| 2005/0165535 | A1 * | 7/2005 | Miller | 701/100 |
| 2007/0034704 | A1 * | 2/2007 | Hu et al. | 237/12.1 |
| 2009/0120088 | A1 | 5/2009 | Chillar et al. | |
| 2009/0143959 | A1 * | 6/2009 | Yamaoka et al. | 701/108 |
| 2009/0145127 | A1 | 6/2009 | Vollmer et al. | |
| 2009/0157230 | A1 | 6/2009 | Hibshman, II et al. | |
| 2009/0218821 | A1 * | 9/2009 | Elkady et al. | 290/52 |
| 2009/0277363 | A1 * | 11/2009 | Shibata et al. | 110/186 |
| 2009/0320577 | A1 * | 12/2009 | Vennettilli et al. | 73/114.31 |
| 2010/0126181 | A1 * | 5/2010 | Ranasinghe et al. | 60/782 |
| 2010/0152918 | A1 | 6/2010 | Riverin | |
| 2011/0011315 | A1 * | 1/2011 | Hayashi et al. | 110/345 |
| 2011/0138766 | A1 * | 6/2011 | Elkady et al. | 60/39.24 |
| 2011/0162382 | A1 | 7/2011 | Riensche et al. | |
| 2012/0000175 | A1 * | 1/2012 | Wormser | 60/39.12 |
| 2012/0036860 | A1 | 2/2012 | Wettstein et al. | |
| 2014/0130507 | A1 | 5/2014 | Wettstein et al. | |

FOREIGN PATENT DOCUMENTS

| | | |
|---|---|---|
| CN | 101457714 A | 6/2009 |
| DE | 102005015151 A1 | 10/2006 |
| DE | 102009044588 A1 | 5/2010 |
| EP | 2 067 941 A2 | 6/2009 |
| EP | 2444631 A1 | 4/2012 |
| JP | A-7-4211 | 1/1995 |
| JP | A-2010-530490 | 9/2010 |
| WO | 2004109075 A1 | 12/2004 |
| WO | 2010/031366 A2 | 3/2010 |
| WO | 2010/049277 A1 | 5/2010 |
| WO | 2010072710 A2 | 7/2010 |
| WO | 2010072729 A2 | 7/2010 |

OTHER PUBLICATIONS

Office Action/Search Report issued on Dec. 9, 2014, by the Chinese Patent Office in corresponding Chinese Patent Application No. 201110319317.8 and an English translation of Office Action/Search Report. (21 pages).

* cited by examiner

COMBINED CYCLE WITH RECIRCULATION PLANT INLET OXYGEN CONCENTRATION SYSTEM

RELATED APPLICATION

The present application hereby claims priority under 35 U.S.C. Section 119 to European Patent application number 10188018.5, filed Oct. 19, 2010, the entire contents of which are hereby incorporated by reference.

FIELD OF INVENTION

The present invention relates to a power plant, in particular to a power plant with flue gas recirculation and a $CO_2$ capture unit.

BACKGROUND

Referring to FIG. 1, WO2010/072710 discloses a power plant having a gas turbine unit 1 that comprises a compressor 2, a combustion chamber 3 and a turbine 4.

A mixture 6 comprising fresh air 7 coming from the environment is fed into the compressor 2 and flue gases 8 (deriving from the combustion of the mixture 6 with a fuel within the combustion chamber 3) emerge from the turbine 4.

These flue gases 8 (that typically have a high temperature) are preferably fed into a boiler 9 of a steam turbine unit 10; within the boiler 9 the flue gases 8 transfer heat to water of the steam unit 10.

From the boiler 9, the flue gases 8 are supplied into a diverter 11, to be split into a recirculated flow 12 and a discharged flow 13.

The recirculated flow 12 is cooled in a cooler 14 provided on a flow path for the same recirculated flow 12; then the recirculated flow 12 is supplied via a fan 15 into a mixer 16, to be mixed with the fresh air 7 and form the mixture 6 that is fed into the compressor 2.

The discharged flow 13 is cooled in a cooler 19 and is then fed, via a fan 20, into a $CO_2$ capture unit 21 to be then discharged into the atmosphere via 22; in contrast the $CO_2$ that is captured in the $CO_2$ capture unit 21 is stored in 24.

Because of the flue gas recirculation, the amount of oxygen at the compressor inlet is lower than its amount in the fresh air. In this respect, the fresh air oxygen concentration is typically around 21 mol %, whereas its concentration at the compressor inlet of a power plant with flue gas recirculation is lower or much lower than 21 mol %.

It is clear that in case the oxygen amount at the compressor inlet is too low, within the combustion chamber 3 the oxygen amount would also be too low and could also fall below the stoichiometric amount (i.e. the minimum amount theoretically needed to achieve complete combustion). In this case incomplete combustion, with high CO, unburned hydro carbons and eventually flame extinction, could occur.

In case a plurality of combustion chambers, with a downstream combustion chamber fed with the flue gases still rich in oxygen coming from an upstream combustion chamber is used (sequential combustion gas turbine unit), this problem is even more severe.

For these reasons, measurement of the oxygen concentration at the gas turbine unit compressor inlet is required.

Nevertheless, the flow conditions upstream of the compressor inlet are very complex and are characterised by high vortices, turbulence and ongoing mixing. In practice, a direct oxygen concentration measure can not be carried out.

SUMMARY

The present disclosure is directed to a power plant including a gas turbine unit adapted to feed flue gases into a diverter where they are divided into a recirculated flow that is fed into a mixer together with fresh air to form a mixture that is fed to a gas turbine unit compressor inlet; and a discharged flow. A monitoring system for the mixture oxygen content at the compressor inlet is also provided. The monitoring system includes at least one recirculated flow mass flow rate sensor, at least one recirculated flow oxygen concentration sensor, at least one mixture mass flow rate sensor. The system also includes a control unit configured to process information detected by the at least one recirculated flow mass flow rate sensor, at least one recirculated flow oxygen concentration sensor and at least one mixture mass flow rate sensor, to determine an oxygen concentration upstream of the compressor inlet.

The disclosure is also directed to a method of operating a power plant including a gas turbine unit adapted to feed flue gases into a diverter where they are divided into a recirculated flow that is fed into a mixer together with fresh air to form a mixture that is fed to a gas turbine unit compressor inlet, and a discharged flow. A monitoring system for a mixture oxygen content at a compressor inlet is also provided. The monitoring system in the method: detects a recirculated flow mass flow rate through at least one recirculated flow mass flow rate sensor; detects a recirculated flow oxygen concentration through at least one recirculated flow oxygen concentration sensor; detects a mixture mass flow rate through at least one mixture mass flow rate sensor; and processes information detected by the at least one recirculated flow mass flow rate sensor, recirculated flow oxygen concentration sensor and mixture mass flow rate sensor through a control unit, to determine an oxygen concentration upstream of the compressor inlet.

BRIEF DESCRIPTION OF THE DRAWINGS

Further characteristics and advantages of the invention will be more apparent from the description of a preferred but non-exclusive embodiment of the power plant illustrated by way of non-limiting example in the accompanying drawings, in which.

DETAILED DESCRIPTION OF THE PREFERRED EMBODIMENTS

Introduction to the Embodiments

Figure 1:
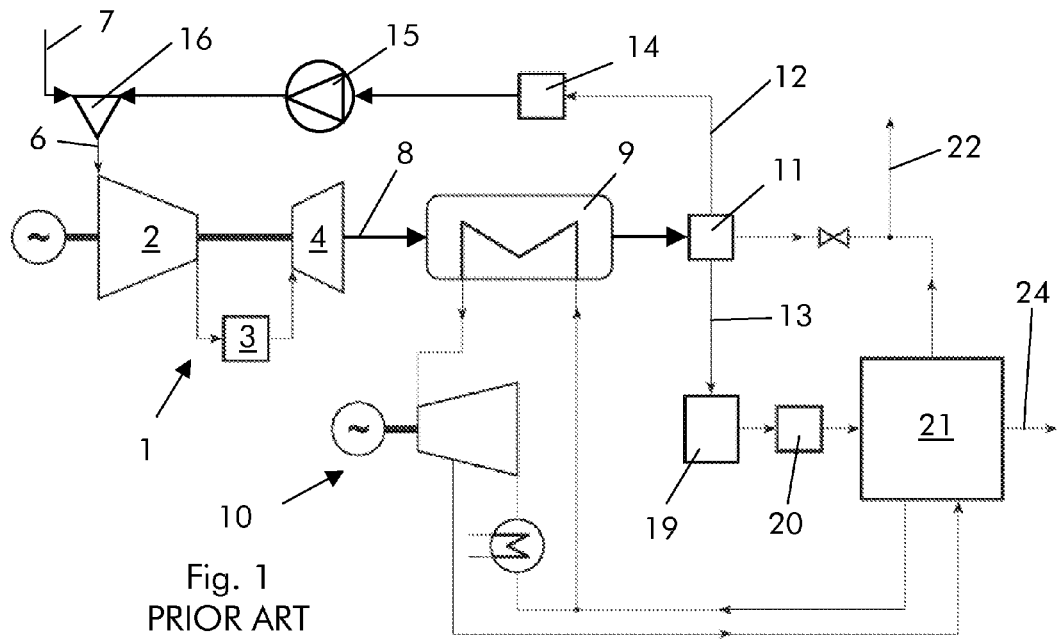
FIG. 1 is a schematic view of a power plant.
Figure 2:
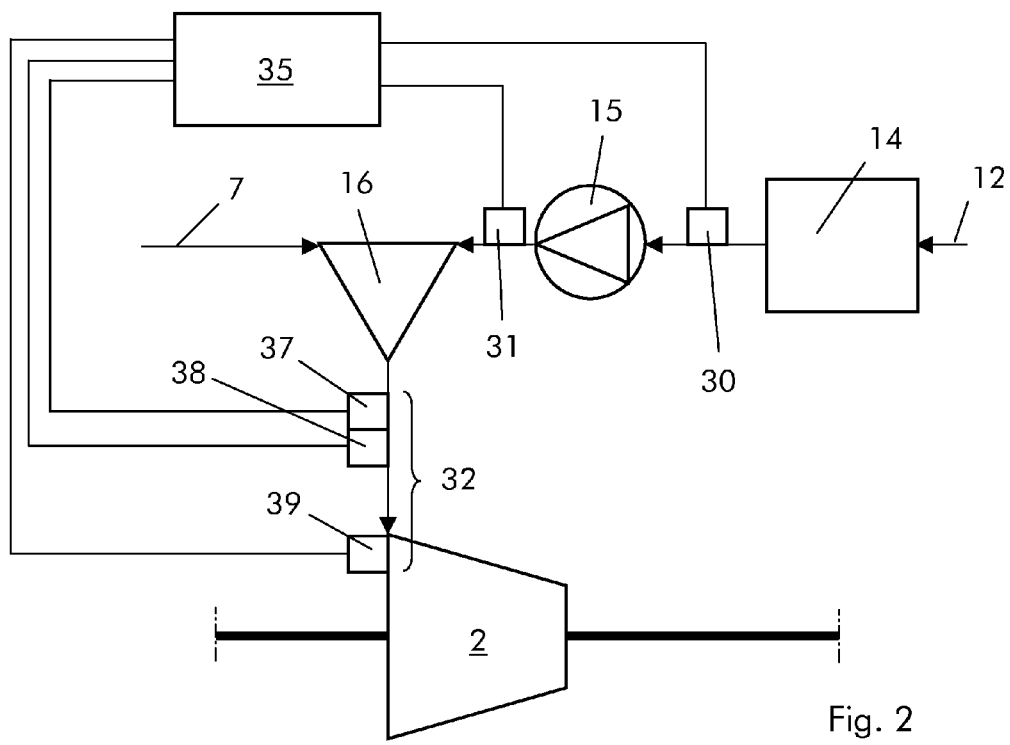
FIG. 2 is a schematic view of a portion of the power plant upstream of the compressor inlet according to the invention.

The technical aim of the present invention therefore includes providing a power plant addressing the aforementioned problems of the known art.

Within the scope of this technical aim, an aspect of the invention is to provide a power plant in which oxygen concentration measures at a zone immediately upstream of the gas turbine unit compressor inlet are made possible.

The technical aim, together with these and further aspects, are attained according to the invention by providing a power plant in accordance with the accompanying claims.

DETAILED DESCRIPTION

In the following, reference is made to the power plant already described, since the power plant in embodiments of the present invention may have the same features.

The power plant includes a monitoring system for the mixture oxygen concentration at the compressor 2 inlet.

The monitoring system comprises a recirculated flow mass flow rate sensor 30, connected upstream of the mixer 16 and preferably downstream of the diverter 11.

A recirculated flow oxygen concentration sensor 31 is also provided upstream of the mixer 16; preferably the sensor 31 is connected downstream of the cooler 14.

In addition, also sensors 32 of the mixture mass flow rate, connected upstream of the compressor 2, are provided.

The monitoring system also comprise a control unit 35 that is connected to the sensors 30, 31 and 32 and is arranged to process the pieces of information detected by them, to attain the oxygen concentration upstream of the compressor inlet (i.e. at the compressor inlet).

In particular, processing is carried out on the basis of the formula:

$$M_{fg} \cdot [O_2]_{fg} + M_{fa} \cdot [O_2]_{fa} = M_m \cdot [O_2]_m$$

wherein:
$M_{fg}$ is the mass flow rate of the flue gases
$[O_2]_{fg}$ is the $O_2$ mass concentration of the flue gases
$M_{fa}$ is the mass flow rate of the fresh air
$[O_2]_{fa}$ is the $O_2$ mass concentration in the fresh air
$M_m$ is the mass flow rate of the mixture fed to the compressor
$[O_2]_m$ is the $O_2$ mass concentration of the mixture fed to the compressor.

Given that:
$M_{fg}$ is measured by sensor 30,
$[O_2]_{fg}$ is measured by sensor 31,
$M_{fa}$ can be calculated from the difference $M_m - M_{fg}$
$[O_2]_{fa}$ is known and it is roughly equal to 23 mass %
$M_m$ is measured by sensors 32
$[O_2]_m$ can be precisely calculated.

Preferably, the control unit 35 includes a computer and these calculations are implemented by program codes running on the control unit 35.

In different embodiments, the sensors 32 are traditional mass flow rate sensors and thus provide a direct measure of the mass flow.

In a preferred different embodiment, the sensors 32 provide an indirect measure of the mass flow rate. In this case the sensors 32 of the mixture mass flow rate comprise a temperature sensor 37, a pressure sensor 38 and a guide vane position control 39 (at the compressor inlet) that are connected to the control unit 35 to supply it with pieces of information that are processed in connection with compressor maps, to attain the required mixture mass flow rate. These sensors are connected upstream of the compressor in the sense that they give a measure of the flow upstream of the compressor 2. It is anyhow clear that the guide vane control is connected to the guide vane and generally to the compressor.

On the basis of the precisely calculated oxygen concentration within the mixture, regulations and operation control can be carried out; for example the FGR ratio (i.e. flue gas recirculation ratio, defined as the recirculated mass flow rate divided by the total mass flow rate passing through the gas turbine unit) may be regulated to guarantee a minimum oxygen concentration within the mixture fed to the compressor inlet in all operating conditions.

Different embodiments are also possible. For example, instead of two coolers 14 and 19, the power plant may also have only one cooler located between the boiler 9 and diverter 11 (example not shown); in this case the sensor 31 will be preferably located downstream of this cooler but after the diverter 11.

The present invention also refers to a method of operating a power plant.

The method comprises detecting the recirculated flow mass flow rate, detecting the recirculated flow oxygen concentration, detecting the mixture mass flow rate, elaborating the pieces of information so detected, to attain the oxygen concentration upstream of the compressor inlet.

Naturally, the features described may be independently provided from one another.

In practice the materials used and the dimensions can be chosen at will according to requirements and to the state of the art.

REFERENCE NUMBERS 1 gas turbine unit
2 compressor of 1
3 combustion chamber of 1
4 turbine of 1
6 mixture
7 fresh air
8 flue gases
9 boiler of 10
10 steam turbine unit
11 diverter
12 recirculated flow
13 discharged flow
14 cooler
15 fan
16 mixer
19 cooler
20 fan
21 $CO_2$ capture unit
22 discharge to the atmosphere
24 $CO_2$ storing
30 mass flow rate sensor
31 $O_2$ concentration sensor
32 sensors of the mixture mass flow rate
35 control unit
37 temperature sensor
38 pressure sensor
39 guide vane position control

What is claimed is:

1. A power plant comprising a gas turbine unit adapted to feed flue gases into a diverter where they are divided into a recirculated flow, that is fed into a mixer together with fresh air to form a mixture that is fed to the gas turbine unit compressor inlet; and a discharged flow, wherein a monitoring system for the mixture oxygen content at the compressor inlet is provided, the monitoring system comprises:
   at least one recirculated flow mass flow rate sensor,
   at least one recirculated flow oxygen concentration sensor configured to measure the oxygen concentration in the recirculated flow that has been diverted by the diverter,
   at least one mixture mass flow rate sensor, located downstream of the mixer, configured to measure the mass flow rate of the mixture entering the compressor, and
   a control unit configured to process information detected by the at least one recirculated flow mass flow rate sensor, the at least one recirculated flow oxygen concentration sensor and the at least one mixture mass flow rate sensor, to determine an oxygen concentration upstream of the compressor inlet.

2. The power plant as claimed in claim 1, wherein the at least one recirculated flow mass flow rate sensor is connected upstream of the mixer.

3. The power plant as claimed in claim 2, wherein the at least one recirculated flow mass flow rate sensor is connected downstream of the diverter.

4. The power plant as claimed in claim 1, wherein the at least one recirculated flow oxygen concentration sensor is connected upstream of the mixer.

5. The power plant as claimed in claim 4, wherein a cooler is provided downstream of a boiler on a flow path for the recirculated flow, and the at least one recirculated flow oxygen concentration sensor is connected downstream of the cooler.

6. The power plant as claimed in claim 1, wherein the at least one mixture mass flow rate sensor is connected at least partly upstream of the compressor.

7. The power plant as claimed in claim 1, wherein the at least one mixture mass flow rate sensor provides an indirect measure of the mass flow rate.

8. The power plant as claimed in claim 7, wherein the at least one mixture mass flow rate sensor comprises a temperature sensor, a pressure sensor and a guide vane position control.

9. The power plant as claimed in claim 8, wherein the temperature sensor, the pressure sensor and the guide vane position control are connected to the control unit to supply it with information that is processed in connection with compressor maps to attain the mixture mass flow rate.

10. The power plant as claimed in claim 1, wherein the discharged flow is fed into a $CO_2$ capture unit.

11. The power plant as claimed in claim 1, wherein a gas turbine unit outlet is connected to a boiler that is in turn connected to the diverter.

12. A method of operating a power plant comprising a gas turbine unit adapted to feed flue gases into a diverter where they are divided into a recirculated flow, that is fed into a mixer together with fresh air to form a mixture that is fed to the gas turbine unit compressor inlet, and a discharged flow, wherein a monitoring system for a mixture oxygen content at the compressor inlet is provided, the method comprising the monitoring system:

detecting a recirculated flow mass flow rate through at least one recirculated flow mass flow rate sensor, detecting, through at least one recirculated flow oxygen concentration sensor, a recirculated flow oxygen concentration in the recirculated flow that has been diverted by the diverter, detecting, through at least one mixture mass flow rate sensor located downstream of the mixer, the mass flow rate of the mixture entering the compressor, and processing information detected by the at least one recirculated flow mass flow rate sensor, the recirculated flow oxygen concentration sensor and the mixture mass flow rate sensor through a control unit, to determine an oxygen concentration upstream of the compressor inlet.

13. The method as claimed in claim 12, wherein the discharged flow is fed into a $CO_2$ capture unit.

14. The method as claimed in claim 12, wherein the flue gases from the gas turbine unit pass through a boiler of a steam turbine unit and are then fed into the diverter.

* * * * *